United States Patent [19]

Smith

[11] Patent Number: 5,630,683
[45] Date of Patent: May 20, 1997

[54] CHIP BREAKER DRILL BUSHING ASSEMBLY

[75] Inventor: David B. Smith, Renton, Wash.

[73] Assignee: The Boeing Company, Seattle, Wash.

[21] Appl. No.: 565,380

[22] Filed: Nov. 30, 1995

[51] Int. Cl.$^6$ ............................................. B23B 49/02
[52] U.S. Cl. ..................... 408/67; 408/72 B; 408/241 B
[58] Field of Search ............................ 408/67, 71 B, 408/95, 97, 115 B, 241 B, 241 G

[56] References Cited

U.S. PATENT DOCUMENTS

| | | | |
|---|---|---|---|
| 2,669,889 | 2/1954 | Huller | 408/241 B |
| 3,874,808 | 4/1975 | Zaccardelli et al. | 408/72 B |
| 4,514,120 | 4/1985 | Hougen | 408/241 B |
| 5,108,241 | 4/1992 | Coss . | |

FOREIGN PATENT DOCUMENTS

| | | | |
|---|---|---|---|
| 2575095 | 6/1986 | France | 408/241 B |
| 212007 | 8/1990 | Japan | 408/115 B |

*Primary Examiner*—Daniel W. Howell
*Attorney, Agent, or Firm*—Christensen, O'Connor, Johnson & Kindness PLLC

[57] ABSTRACT

A chip breaker drill bushing assembly (11) for a fluted drill bit (37) is disclosed. The assembly comprises a drill bushing housing (13) and a sleeve (15). The drill busing housing (13) includes a body (17) and an outwardly protruding guide shaft (19). The guide shaft has a smooth end (31) for tightly contacting the surface of a work piece (63) to be drilled. The sleeve (15) is located in the body (17) of the housing (13), in alignment with the guide shaft. The end of the sleeve (15) facing the tip (29) of the guide shaft (19) includes a chip breaker (41). The chip breaker (41) includes two spaced-apart teeth (46a, 46b) that are defined by two helical troughs (47a, 47b) that protrude into the sleeve (15). The two helical troughs (47a, 47b) are aligned with two longitudinal apertures (33) in the outwardly protruding guide shaft (19).

28 Claims, 2 Drawing Sheets

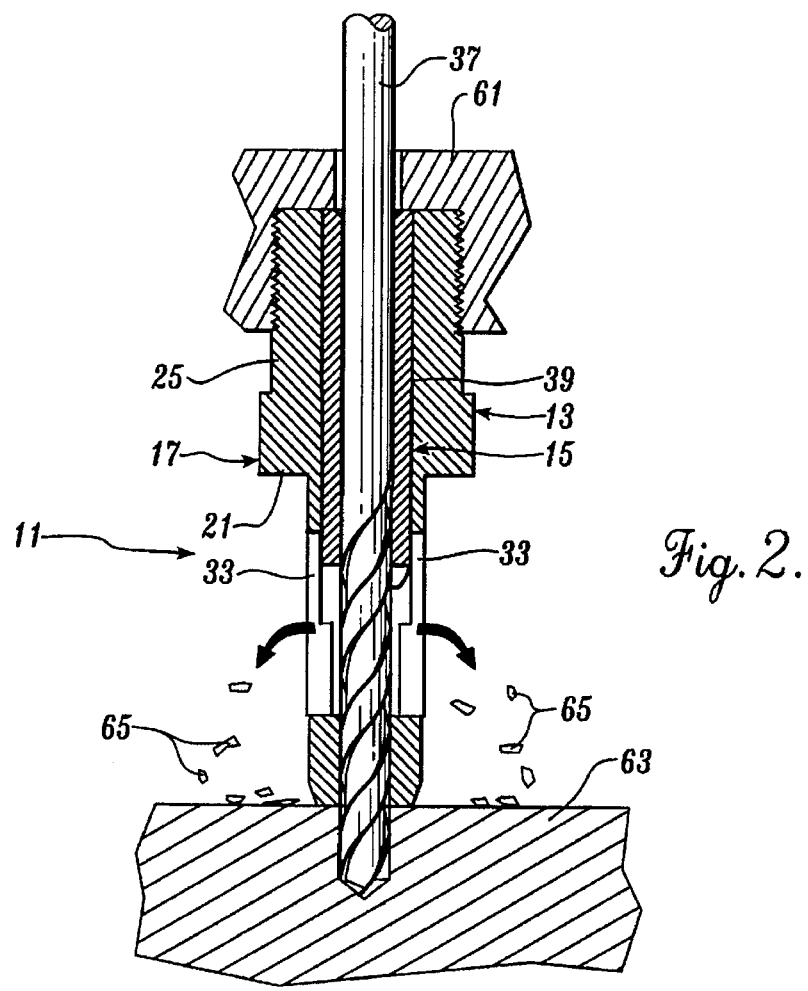
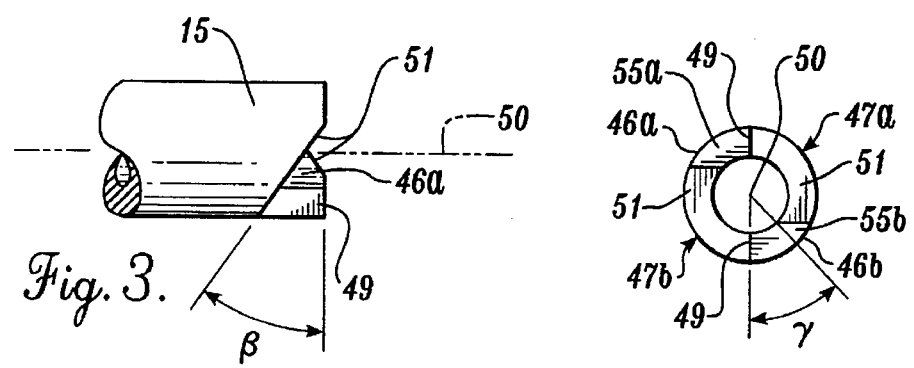
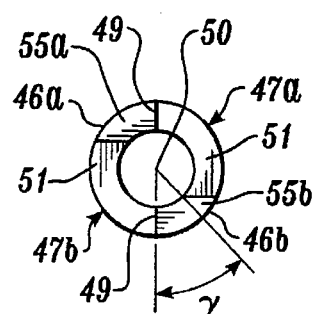
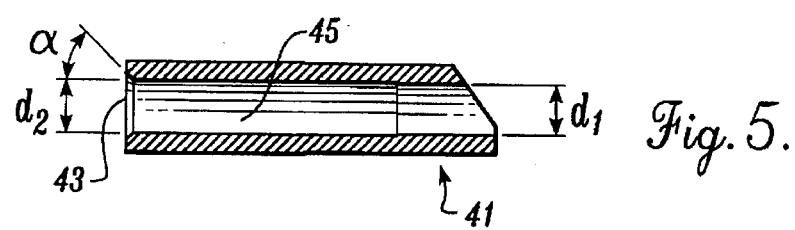

CHIP BREAKER DRILL BUSHING ASSEMBLY

TECHNICAL AREA

This invention relates to drilling holes into a work piece and, more particularly, to chip breakers for breaking large drill chips into smaller chips.

BACKGROUND OF THE INVENTION

When a fluted drill bit is used to drill a hole into a work piece, particularly a metal work piece, there is a tendency to create long drill chips. The long drill chips travel up the flutes of the drill bit, particularly if the work piece is metal. Metal chips that travel up the flutes of a drill bit can become tangled around the drill bit or wedged between the drill bit and surrounding hardware. In contrast to long chips, small, short drill chips tend to be forced away from the a drill bit by centrifugal force.

In some environments, such as the fabrication of aircraft, where many holes are drilled into thick aluminum sections, vacuum lines are used to remove metal chips from the area around holes as the holes are being drilled. Long chips can plug the vacuum line. In order to prevent this from occurring, vacuum lines are constantly cleaned with hazardous solvents that may not be available in the future.

In order to overcome the disadvantages associated with long drill chips, various proposals have been made to reduce chip size to make chips more manageable. Past attempts have included varying drill bit speed and drill bit feed rate to create a chip size that breaks up naturally. Unfortunately, this approach results in increased cycle time per hole, a reduction in hole quality and excessive wear on drill bits. As a result, a number of bushing designs and special drill geometries whose purpose is to reduce the size of drill chips have been proposed. None has been entirely successful. One such drill bushing design is described in U.S. Pat. No. 5,108,241, entitled "Chip Breaker Drill Bushing Assembly" by David A. Cross, assigned to the assignee of the present application.

Prior art bushing designs developed to solve the long chip problem by breaking up long chips into smaller chips have created a number of new problems. These include chip packing in the drill template if a template is being used, chips jamming between the drill bit and the drill bit bushing, which prevents the release of the nose piece from the end effector of a robotic arm used to position and operate the drill bit, and increasing the load on the drill motor and its sensors, which affects the performance (quality or cost) of the drilling process and/or monitoring.

The present invention is directed to providing a chip breaker drill bushing assembly that overcomes the foregoing disadvantages of prior art methods and apparatus directed to eliminating the problems associated with long drill chips.

SUMMARY OF THE INVENTION

In accordance with this invention, a chip breaker drill bushing assembly for a fluted drill bit is provided. The assembly comprises a drill bushing housing and a sleeve. The drill bushing housing includes a body and an outwardly protruding guide shaft. The guide shaft includes a tip with a hole sized to receive the drill bit with which the chip breaker drill bit assembly is to be used. The sleeve is located in the body of the housing, in alignment with the guide shaft. The end of the sleeve facing the tip of the guide shaft includes a chip breaker. The chip breaker is formed by spaced-apart teeth defined by helical troughs that protrude into the sleeve. Located in the guide shaft between the tip of the guide shaft and the chip breaker end of the sleeve are chip disposal apertures equal in number to the number of spaced-apart teeth.

In accordance with the other aspects of this invention, the chip breaker end of the sleeve includes two teeth and two chip disposal apertures.

In accordance with further aspects of this invention, the helical troughs include two edges, a helical edge, and a radial edge. The helical edge forms an acute angle with respect to an orthogonal plane that extends through the longitudinal center line of the sleeve. The angle defined by the helical edge is opposite to the direction of twist of the fluted drill bit with which the chip breaker drill bushing assembly is to be used. The radial edge lies along a radius of the longitudinal center line of the sleeve.

In accordance with still further aspects of this invention, the guide shaft of the drill bushing housing the two chip disposal apertures are located inwardly of the smooth tip. The chip disposal apertures terminate slightly beyond the chip breaker end of the sleeve.

In accordance with still other aspects of this invention, the internal diameter of the sleeve near the chip breaker end is slightly smaller than the remainder of the sleeve.

In accordance with yet other aspects of this invention, the smaller internal diameter of the sleeve is substantially the same as the diameter of the hole in the tip of the guide shaft.

In accordance with yet further aspects of this invention, the sleeve is press fit into the body of the housing.

In accordance with yet still other aspects of the invention, the outer diameter of the sleeve near the chip breaker end is slightly smaller than the remainder of the sleeve.

In accordance with yet still further aspects of this invention, the tip of the guide shaft has a smooth outer end for tightly contacting the surface of a work piece to be drilled.

As will be readily appreciated from the foregoing summary, the invention provides a new and improved chip breaker drill bushing assembly that overcomes the disadvantages of prior art devices for breaking up long drill chips. Because the outer end of the tip of the guide shaft is smooth, the outer end can be tightly pressed against the surface of a work piece to be drilled. As a result, drill chips are not prevented from entering this region. Thus, chips are prevented from packing a drilling template. Further, only those chips that have to be broken up are cut. Other chips are removed by centrifugal force before they reach the chip breaker end of the sleeve. As a result, the load on the drill motor is maintained low.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a cross-sectional, assembled view of the chip breaker drill bushing assembly shown in FIG. 1;

FIG. 3 is a side view of the chip breaker end of the sleeve of the embodiment of the invention illustrated in FIGS. 1 and 2;

FIG. 4 is an end view of the chip breaker end of the sleeve of the embodiment of the invention illustrated in FIG. 1 and 2; and FIG. 5 is a cross-sectional view of the sleeve of the chip breaker drill bushing assembly illustrated in FIGS. 1 and 2.

DETAILED DESCRIPTION OF THE PREFERRED EMBODIMENT

Figure 1:
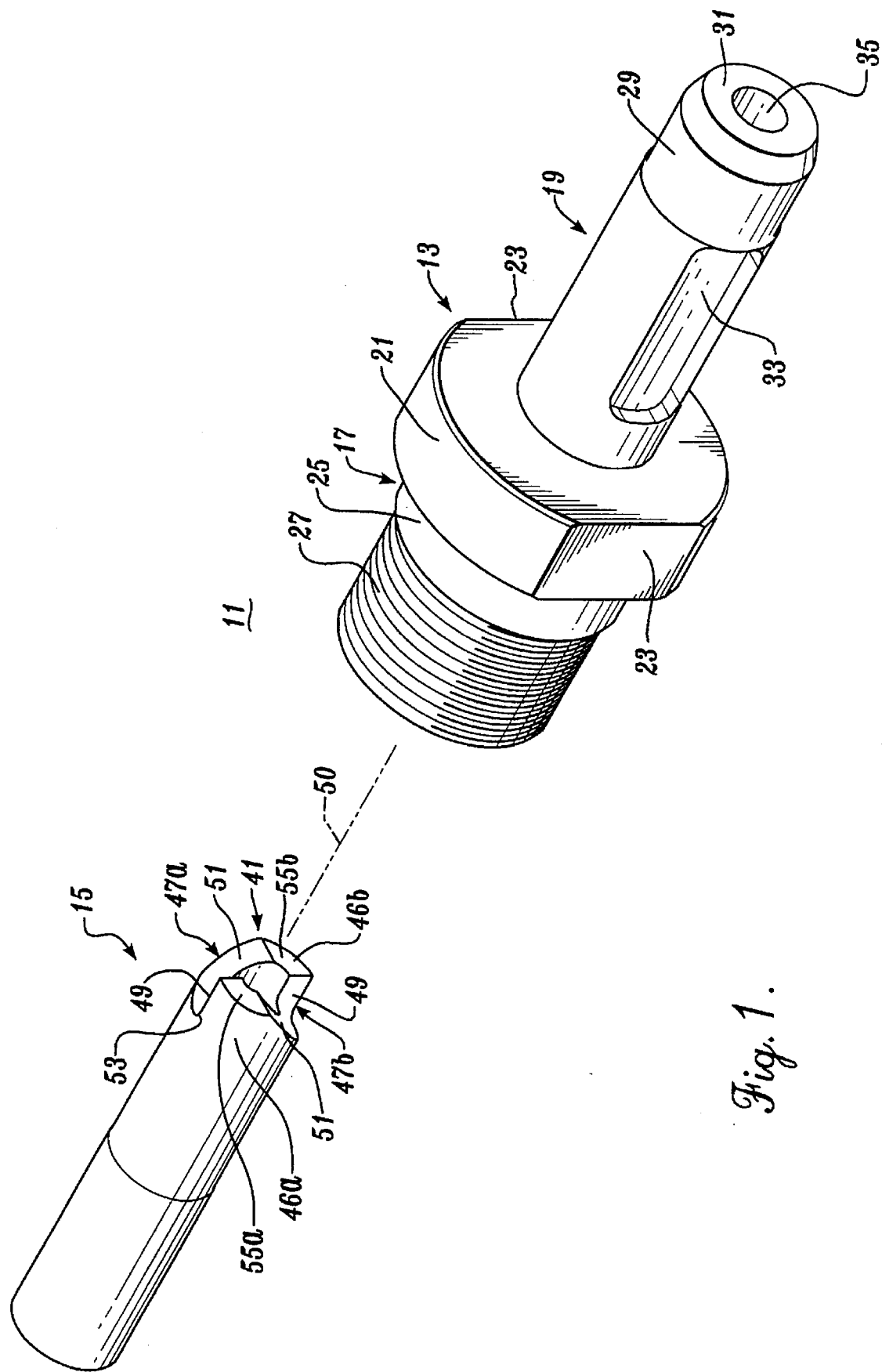
FIG. 1 is an exploded view of a chip breaker drill bushing assembly formed in accordance with the invention.

As will be better understood from the following description, the invention is directed to a chip breaker drill bushing assembly suitable for use with the end effector of a robotic arm used to automatically drill holes at precise positions in work pieces. While described in connection with a robotic arm, it is to be understood the invention can also be utilized with other types of drilling systems. For example, a chip breaker drill bushing assembly formed in accordance with this invention could be used with a conventional drill press modified to incorporate the invention.

As shown in drawings, a chip breaker drill bushing assembly 11 formed in accordance with the invention comprises a drill bushing housing 13 and a chip breaker sleeve 15. The drill bushing housing 13 is generally cylindrical and includes a body 17 and a guide shaft 19. The body 17 includes a generally cylindrical collar 21 having a pair of opposed flanges 23. The body 17 also includes a neck 25 extending outwardly from one side of the collar 21. The neck terminates in a plurality of threads 27.

The guide shaft 19 extends coaxially outwardly from the side of the collar 21 opposite the neck 25. The outer end of the guide shaft 19 includes a tip 29 whose outer end 31 is smooth. Located in the sides of the guide shaft 19 between the tip 29 and the collar 21 are a pair of longitudinal apertures 33. The longitudinal apertures 33 are located on opposite sides of the guide shaft 19. Extending longitudinally through the tip 29 is a hole 35 whose diameter is the same as the diameter of the drill 37 (FIG. 2) for which the chip breaker drill bushing assembly is designed to be used. That is, the diameter of the hole 35 depends on the diameter of the drill bit to be used in the chip breaker drill bushing assembly 11. Each different-sized drill bit needs a different-sized chip breaker drill bushing assembly.

The body 17 and the portion of the guide shaft 19 inward from the tip 29 includes a longitudinal cylindrical hole 39 whose diameter is substantially greater than the diameter of the hole 35 in the tip 29. As described more fully below, the sleeve 15 is press fit into the hole 39 and extends from the threaded end of the body 17 to the inner end of the longitudinal apertures 33.

The chip breaker sleeve 15 is cylindrical and includes a chip breaker 41 located at one end. The other end of the chip breaker sleeve 15 is flat and includes a slight countersink 43 surrounding the central cylindrical aperture 45 of the chip breaker sleeve 15. Preferably, the angle α of the countersink falls in the range of 30° to 60°. In one actual embodiment of the invention, the angle α equals 45°.

The chip breaker 41 includes two teeth 46a and 46b defined by two helical troughs 47a and 47b that protrude into the sleeve 15. The helical troughs are each defined by a radial edge 49 and a helical edge 51. The radial edge 49 extends inwardly from the end of the cylindrical sleeve 15 containing the chip breaker 41. As best seen in FIG. 4, the radial edges 49 lie along a diameter that bisects the longitudinal axis 50 of the chip breaker sleeve 15. The helical surfaces 51 extend inwardly from the chip breaker end of the chip breaker sleeve 15. As best seen in FIG. 3, the helical edges 51 form an acute angle β with respect to a plane that lies orthogonal to the longitudinal axis of the sleeve 15. As seen best by comparing FIGS. 2 and 3, the direction of the angle β is opposite to the direction of the flutes of the drill bit 37. More specifically, the drill bit 37 shown in FIG. 2 has a clockwise twist when viewed from the bit end. In contrast, as shown in FIG. 3, the helical edges 51 of the helical troughs 47a and 47b have a counterclockwise twist when viewed from the chip breaker end of the sleeve 15. Preferably, β lies in the range of 15° to 50°, the preferred angle equaling the angle of the flutes of the drill bit with which the chip breaker drill bushing assembly 11 is to be used. In one actual embodiment of the invention, the angle β equals 36°. The radial and helical edges 49 and 51 are joined by a curved region 53.

The ends 55a and 55b of the teeth 46a and 46b between the helical troughs 47a and 47b are flat and lie orthogonal to the longitudinal axis 50 of the sleeve 15. As shown in FIG. 4, the flat ends 55a and 55b subtend an angle γ that extends between the radial edge 49 located on one side of a flat end 55a or 55b and the point where the helical edge 51 begins at the other side of the flat end 55a or 55b. Preferably δ falls in the range of 32° to 50°. In one actual embodiment of the invention, γ equals 44°.

As shown best in FIGS. 1 and 5, approximately one-half of the external diameter of the sleeve 15 is slightly larger than the other one-half. The smaller diameter portion extends inwardly from the chip breaker end of the sleeve. The smaller diameter portion is slightly less than the diameter of the longitudinal cylindrical hole 39 in the body 17 of the drill bushing housing 13. The larger diameter portion is slightly larger than the longitudinal cylinder hole 39. This allows the sleeve 15 to be press fit into the drill bushing housing. When the sleeve is correctly positioned in the longitudinal cylindrical hole 39, the chip breaker 41 faces the tip 29 of the guide shaft 19 and the helical troughs 47a and 47b are positioned in alignment with and near the inner ends of the longitudinal apertures 33. Preferably, the alignment is such that the radial edge 40 of each trough, which forms the cutting edge of the trough, is generally aligned with an edge of one of the apertures.

As shown in FIG. 5, the diameter of the central cylindrical aperture 45 of the chip breaker sleeve also has two different diameter regions $d_1$ and $d_2$. The smaller diameter region $d_1$ extends inwardly from the chip breaker end for about one-quarter the length of the sleeve 15. The diameter of the smaller diameter region is substantially the same as the diameter of the hole 35 in the tip 29, which, as noted above, is substantially the same as the diameter of the fluted drill 37 for which the chip breaker drill bushing assembly 11 is designed to be used.

As shown in FIG. 4, the threaded end 27 of the neck 25 is designed for mounting in a housing 61 that may, for example, form the end of an end effector of a robotic arm. In operation, the robotic arm moves the tip 29 into position and presses the smooth end 31 tightly against the work piece 63 to be drilled. Thereafter, the rotating drill bit 37 is moved out of the end of the tip 29 into the work piece 63. As the work piece is being drilled, chips move through the flutes in the drill bit 37. Chips 65 are centrifugally tossed out of the longitudinal apertures 33 in the side of the guide shaft 19. Chips that are not initially tossed out of the longitudinal apertures 33 and travel up the drill bit 37 are broken up by the chip breaker 41 into smaller pieces and then tossed out of the longitudinal apertures. If desired, a vacuum attachment can be used to remove the relatively small chips 65 as they exit the longitudinal apertures 33.

As will be readily appreciated from the foregoing description, the invention provides a chip breaker drill bushing assembly that cuts and removes through the longitudinal apertures chips that try to wind and/or pack around the shank of a drill bit during a drilling process. This result is accomplished without unduly loading the drill drive motor or process control sensors (thrust and torque).

While the presently preferred embodiment of the invention has been illustrated and described, it will be appreciated that various changes can be made therein. For example, as noted above, rather than being used with the end effector of a robotic arm, the invention can be utilized in other environments, with appropriate changes being made in the illustrated structure. Further, rather than two teeth and two apertures, more teeth and more apertures can be included. The number of teeth and apertures must be the same and the troughs must be aligned with the apertures in the manner described above, i.e., the troughs must be in alignment with the apertures and preferably oriented such that the radial, i.e., cutting, edge of the troughs is generally aligned with one of the edges of the apertures. In some versions of the invention one trough and aperture may prove to be satisfactory. Consequently, within the scope of the appended claims, it is to be understood the invention can be practiced otherwise than as specifically described herein.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A chip breaker drill bushing assembly comprising:
    (a) a drill bushing housing including a body and an outwardly protruding guide shaft, said guide shaft including a tip having a hole for receiving a drill bit, said guide shaft including at least one chip disposal aperture located between said tip and said body; and
    (b) a sleeve located in said body, in alignment with said guide shaft, the end of said sleeve facing the tip of the guide shaft including a chip breaker, said chip breaker including at least one helical trough that protrudes into said sleeve and is aligned with said at least one chip disposal aperture.

2. A chip breaker drill bushing assembly as claimed in claim 1, wherein the chip breaker end of said drill bushing housing includes two chip disposal apertures and said sleeve includes two helical troughs, one of said helical troughs aligned with each of said chip disposal apertures.

3. A chip breaker drill bushing assembly as claimed in claim 2, wherein said helical troughs include two edges, a helical edge and a radial edge, said helical edge forming an acute angle with respect to an orthogonal plane that extends through the longitudinal center line of the sleeve, said radial edge aligned along a radius of the longitudinal center line of said sleeve.

4. A chip breaker drill bushing assembly as claimed in claim 3, wherein the direction of twist of said helical troughs is opposite to the direction of twist of the drill bit with which the chip drill breaker bushing assembly is to be used.

5. A chip breaker drill bushing assembly as claimed in claim 4, wherein the radial edges of said helical troughs are generally aligned with an edge of a related chip disposal aperture.

6. A chip breaker drill bushing assembly as claimed in claim 5, wherein the internal diameter of the sleeve near the chip breaker end is slightly smaller than the remainder of the sleeve, said smaller portion of the internal diameter of said sleeve being substantially the same as the diameter of the hole in said tip.

7. A chip breaker drill bushing assembly as claimed in claim 6, wherein said sleeve is press fit into the body of said housing.

8. A chip breaker drill bushing assembly as claimed in claim 7, wherein the outer diameter of the sleeve near the chip breaker end is slightly smaller than the remainder of the sleeve.

9. A chip breaker drill bushing assembly as claimed in claim 8, wherein the tip of the guide shaft has a smooth outer end for tightly contacting the surface of a work piece to be drilled.

10. A chip breaker drill bushing assembly as claimed in claim 1, wherein said at least one helical trough includes two edges, a helical edge and a radial edge, said helical edge forming an acute angle with respect to an orthogonal plane that extends through the longitudinal center line of the sleeve, said radial edge aligned along a radius of the longitudinal center line of said sleeve.

11. A chip breaker drill bushing assembly as claimed in claim 10, wherein the direction of twist of said at least one helical trough is opposite to the direction of twist of the drill bit with which the chip drill breaker bushing assembly is to be used.

12. A chip breaker drill bushing assembly as claimed in claim 11, wherein the radial edge of said at least one helical trough is generally aligned with an edge of said at least one chip disposal aperture.

13. A chip breaker drill bushing assembly as claimed in claim 12, wherein the internal diameter of the sleeve near the chip breaker end is slightly smaller than the remainder of the sleeve, said smaller portion of the internal diameter of said sleeve being substantially the same as the diameter of the hole in said tip.

14. A chip breaker drill bushing assembly as claimed in claim 13, wherein said sleeve is press fit into the body of said housing.

15. A chip breaker drill bushing assembly as claimed in claim 14, wherein the outer diameter of the sleeve near the chip breaker end is slightly smaller than the remainder of the sleeve.

16. A chip breaker drill bushing assembly as claimed in claim 15, wherein the tip of the guide shaft has a smooth outer end for tightly contacting the surface of a work piece to be drilled.

17. A chip breaker drill bushing assembly as claimed in claim 1, wherein the direction of twist of said at least one helical trough is opposite to the direction of twist of the drill bit with which the chip drill breaker bushing assembly is to be used.

18. A chip breaker drill bushing assembly as claimed in claim 17, wherein said at least one helical trough is generally aligned with said at least one chip disposal aperture.

19. A chip breaker drill bushing assembly as claimed in claim 18, wherein the internal diameter of the sleeve near the chip breaker end is slightly smaller than the remainder of the sleeve, said smaller portion of the internal diameter of said sleeve being substantially the same as the diameter of the hole in said tip.

20. A chip breaker drill bushing assembly as claimed in claim 19, wherein said sleeve is press fit into the body of said housing.

21. A chip breaker drill bushing assembly as claimed in claim 20, wherein the outer diameter of the sleeve near the chip breaker end is slightly smaller than the remainder of the sleeve.

22. A chip breaker drill bushing assembly as claimed in claim 21, wherein the tip of the guide shaft has a smooth outer end for tightly contacting the surface of a work piece to be drilled.

23. A chip breaker drill bushing assembly as claimed in claim 1, wherein said at least one helical trough is generally aligned with said at least one chip disposal aperture.

24. A chip breaker drill bushing assembly as claimed in claim 1, wherein the internal diameter of the sleeve near the chip breaker end is slightly smaller than the remainder of the sleeve, said smaller portion of the internal diameter of said sleeve being substantially the same as the diameter of the hole in said tip.

25. A chip breaker drill bushing assembly as claimed in claim 1, wherein said sleeve is press fit into the body of said housing.

26. A chip breaker drill bushing assembly as claimed in claim 25, wherein the outer diameter of the sleeve near the chip breaker end is slightly smaller than the remainder of the sleeve.

27. A chip breaker drill bushing assembly as claimed in claim 1, wherein the outer diameter of the sleeve near the chip breaker end is slightly smaller than the remainder of the sleeve.

28. A chip breaker drill bushing assembly as claimed in claim 1, wherein the tip of the guide shaft has a smooth outer end for tightly contacting the surface of a work piece to be drilled.

* * * * *